United States Patent Office 3,062,830
Patented Nov. 6, 1962

3,062,830
PHTHALOCYANINE DYESTUFFS
Saul R. Buc and Harlan B. Freyermuth, Easton, Pa., and Raymond L. Mayhew, Phillipsburg, and David I. Randall, New Vernon, N.J., assignors to General Aniline & Film Corporation, New York, N.Y., a corporation of Delaware
No Drawing. Filed Nov. 27, 1959, Ser. No. 855,550
3 Claims. (Cl. 260—314.5)

This invention relates to novel phthalocyanine dyestuffs and more particularly to soluble phthalocyanine dyestuffs capable of reacting with textile fibers and the like.

Dyestuffs containing groupings capable of reacting molecularly with textile fibers have been synthesized in the past, but their commercial acceptance has been only a recent development. The use of reactive dyestuffs has been increasing in view of the potential excellent fastness properties, brilliant shades and ease of application. Since by use of reactive dyestuffs, the dyestuff molecule becomes chemically bound to the fiber molecule, exceptional wash fastness properties are possible of attainment.

In the prior art, there is disclosed a phthalocyanine dyestuff containing sulfatoethylsulfonylmethyl groups directly substituted in the nuclear moieties of the phthalocyanine molecule. This dyestuff is, however, extremely difficult or impossible to prepare in a commercially acceptable form principally because of the degradation due to oxidation of the phthalocyanine molecule occurring in the normal process of making this dyestuff, involving chloromethylation, reaction with mercaptoethanol, and oxidation to the sulfone. Further, the number of sulfatoethylsulfonylmethyl groups which may be nuclearly substituted in the phthalocyanine molecule is limited, whereby the dyestuff contains an insufficient number of such groups for the attainment of the desired solubility and optimum reactivity with textile fibers.

It is an object of this invention to provide a class of novel phthalocyanine dyestuffs capable of dyeing textile fibers and the like. Another object of this invention is the provision of such a class of dyestuffs which is relatively more reactive towards textile fibers and the like. Still another object of this invention is the provision of such a class of dyestuffs which may be employed in dyeing textile fibers to produce dyeings having improved properties such as fastness, and/or brightness and the like. A further object of this invention is to provide water-soluble dyestuff molecules containing nuclearly bound sulfonic acid groups which are conveniently suitable for use of the dyer and which do not precipitate prematurely during dyestuff padding operations.

A further object of this invention is the provision of such a class of dyestuffs which may be readily manufactured without undue degradation of the dyestuff and other undesired effects. A still further object of this invention is the provision of such a class of dyestuffs which will not be subject to the disadvantages attributable to prior art phthalocyanine dyestuffs. Other objects and advantages will appear as the description proceeds.

The attainment of the above objects is made possible by the present invention which includes the provision of phthalocyanine dyestuffs having the formula

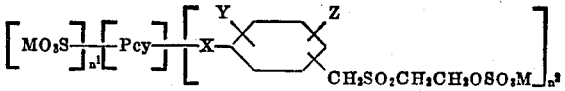

wherein Pcy represents a phthalocyanine molecule; X represents a mono-, di-, or triatomic bridging link; Y and Z are selected from the group consisting of H, lower alkyl, lower alkoxy, and $—CH_2SO_2CH_2CH_2OSO_3M$; M is a member of the group consisting of H and alkali metal, alkaline earth metal, ammonium and amine cations; $n^1$ has an average value of 0 to 3; $n^2$ has an average value of 1 to 4; and the sum of $n^1$ and $n^2$ is no more than 4.

It has been found that dyestuffs of the above formula are readily and economically manufactured, relatively speaking, and are readily applied from solution to textile fibers and the like by dyeing, padding and printing for the production of improved dyeings. It will be noted that the sulfatoethylsulfonylmethyl groups in these dyestuffs are substituted in pendant aryl nuclei, whereby such dyestuffs may contain a greater number of such groups. This is because the pendant aryl nuclei in the present dyestuffs are much more susceptible of multiple substitution with sulfatoethylsulfonylmethyl groups than are the nuclei in the phthalocyanine molecule per se (the fundamental phthalocyanine nuclei). It is accordingly possible to produce dyestuffs of the present invention having 2 or more sulfatoethylsulfonylmethyl groups substituted in the same aryl nucleus and/or more such groups substituted in the dyestuff molecule than is possible with the prior art dyestuffs.

In the subject dyestuffs the presence of a non-removable nuclearly substituted solubilizing group ($SO_3M$) has been found decidedly advantageous in avoiding premature precipitation due to reaction of the "reactive" dye groupings during the dyeing process. While earlier practice would lead one to believe that retaining a non-removable water-soluble grouping in the dyestuff moiety would impair wash fastness, it has unexpectedly been found that in the case of the subject dyestuff this effect is outweighed by the reactive bonding between the dye and the fiber.

In the above formula, Pcy may represent an unmetallized phthalocyanine molecule or a metal phthalocyanine molecule of known type. As examples of metal phthalocyanine molecules there may be mentioned copper, cobalt, aluminum, vanadium, tin, zinc, nickel iron, magnesium, chromium and other metal phthalocyanines. Further, Pcy may represent, whether metallized or unmetallized, a phthalocyanine molecule unsubstituted or nuclearly substituted by lower alkyl such as methyl, halogen such as chlorine or bromine, or phenyl. One or a plurality of such substituents may be present. When Pcy represents a phenyl substituted phthalocyanine, none, some or all of the right and left-hand bracketed portions in the above formula may be bonded to the phenyl substitutent or substituents.

In the above formula, X preferably represents the diatomic bridging link $—SO_2NR—$, wherein R is alkyl of 1 to 4 carbon atoms, e.g. methyl to butyl or preferably H, as more fully described below. However, the identity of X is not too critical, and may also represent other known equivalent mono-, di-, or triatomic bridging links suitable for connecting the pendant aryl nuclei in the present compounds to the fundamental aryl nuclei of the phthalocyanine molecule. Examples of such bridging links joining pendant aryl nucleii to the fundamental phthalocyanine nuclei are disclosed in U.S. Patents 2,542,328, 2,479,491, etc. Illustratively, other suitable bridging links include $—O—$, $—NR—$, $—NRSO_2—$, $—SO_2NHNH—$, $—CH_2—$, $—C_2H_4—$, $—CH_2SO_2—$, $—CH_2NR—$, $—CH_2S—$, $—CH_2O—$, $—CO—$, $—S—$, $—CONH—$, $—NHCO—$, and $—SCH_2—$, the actual linking atoms in such bridging links being generally C, S, O or N or any combination thereof. Methods for producing dyestuffs of the present type containing such bridging links are disclosed in the aforementioned patents and will otherwise become apparent to persons skilled in the art.

As shown in the above formula, Y and Z may represent H, lower alkyl such as methyl and ethyl, lower alkoxy such as methoxy and ethoxy, and the sulfatoethylsulfonylmethyl group. M may represent H, sodium, potassium, lithium, calcium, barium, magnesium, ammonium, mono-, dis-, and tri-ethanol-, -propanol-, -methyl-, -ethyl-, and -propyl-amines, cyclohexylamine, morpholine, pyridine, picoline and the like. It will be understood that the products of this invention will comprise mixtures of molecules containing different amounts of substituents attached to Pcy in the above formula, and that $n^1$ and $n^2$ represent the averages of such substituents therein.

In accordance with the preferred embodiment of this invention, a phthalocyanine compound, unmetallized or metallized and unsubstituted or substituted as above described, is reacted in known manner with chlorosulfonic acid to introduce from 1 to 4 sulfonyl chloride groups and 0 to 3 sulfonic acid groups, the sum of these sulfonyl chloride and sulfonic acid groups introduced into any single phthalocyanine molecule being no more than 4. This sulfonyl chloride-containing derivative may then be reacted with an intermediate having the formula shown in the right-hand bracketed portion, X being amino, whereby the desired dyestuff is produced by reaction between the sulfonyl chloride groups of said derivative and the amino groups of the intermediate, with elimination of HCl. At least one molecule of the said intermediate and preferably the number of molecules of such intermediate equal to the number of sulfonyl chloride groups in said derivative ($n^2$) are employed in this reaction. If desired, the corresponding hydroxyethylsulfonylmethyl-substituted intermediate may be employed in this reaction and the terminal hydroxy group subsequently esterified to produce the desired terminal sulfato structure shown. Desirably, at least one of Y and Z in the intermediate is —CH$_2$SO$_2$CH$_2$CH$_2$OSO$_3$M or

—CH$_2$SO$_2$CH$_2$CH$_2$OH in the latter case a subsequent sulfation being required as indicated above.

Thus, in accordance with the above described preferred embodiment, dyestuffs of the present invention may be prepared by reacting 5-amino-2-methyl-m-xylylene-$\alpha^1,\alpha^3$-bis(2-sulfonylethanol) (or the corresponding bis-sulfate ester) with chlorosulfonated copper phthalocyanine, followed if necessary by converting the terminal hydroxy groups of the resulting sulfonamide-linked compound to the corresponding bis-sulfate ester with concentrated sulfuric acid. No claim is herewith made to the novel 5-amino-2-methyl-m-xylylene-$\alpha^1,\alpha^3$-bis(2 - sulfonylethanol) (or its bis-sulfate ester) which may be prepared by bis-chloromethylating 4-nitrotoluene in sulfuric acid or chlorosulfonic acid, condensing the resulting bischloromethylated derivative with mercaptoethanol, oxidizing the sulfide through the sulfoxide to the sulfone, and finally reducing the nitro derivative to the corresponding amine (and when indicated, forming the corresponding bis-sulfate ester by reaction with a sulfating agent).

The phthalocyanine precursor may be reacted in known manner with chlorosulfonic acid, for example as described in U. S. 2,219,330, to produce the desired derivative containing at least one and up to 4 sulfonyl chloride groups. This reaction is generally carried out at elevated temperatures, generally above 100° C. and preferably in the presence of some phosphorus pentachloride. The chlorosulfonated intermediate is then isolated by drowning the reaction mixture in ice and filtering off the precipitated product. The product may contain an average of 0 to 3 sulfonic acid groups and 1 to 4 sulfonyl chloride groups, depending upon variations in reaction conditions, particularly in the temperature and ratios of reactants in the chlorosulfonation process. Preferably, conditions are employed whereby the chlorosulfonated phthalocyanine contains at least one sulfonic acid group, thereby increasing the adaptability of the dyestuff for dyeing purposes in that precipitation of the dyestuff during dyeing is minimized or prevented. In any event, in the subsequent sulfamidation reaction, some of the sulfonyl chloride groups in the chlorosulfonated phthalocyanine, will tend to be hydrolyzed in the aqueous medium employed to form nuclearly substituted sulfonic acid groups. Alternatively, the dyestuff if devoid of sulfonic acid groups, can be subsequently sulfonated prior to use for dyeing textile fibers and the like.

As stated above, other derivatives, intermediates and methods may be employed for introducing sulfatoethylsulfonylmethyl-substituted pendant aryl nuclei into the phthalocyanine molecule through the various types of bridging links. Illustratively, a phthalocyanine compound may be chloromethylated, and the chloromethyl-substituted phthalocyanine reacted with an aminobenzene compound containing at least one sulfate- or hydroxyethylsulfonylmethyl group, the resulting reaction product in the latter case then being treated with sulfuric acid, to produce the corresponding sulfatoethylsulfonylmethyl-containing dyestuffs in accordance with the present invention. The conditions of the final sulfation may if desired be controlled in order to simultaneously sulfonate the dyestuff. In this instance, the bridging link X is the group —CH$_2$NH—.

As another illustration, the above mentioned 5-amino-2-methyl-m-xylylene-$\alpha^1,\alpha^3$-bis(2-sulfonylethanol) or its bis-sulfate ester may be diazotized and reduced in known manner to produce the corresponding hydrazine, which hydrazine derivative may then be reacted with the chlorosulfonated phthalocyanine with elimination of HCl, followed if necessary by sulfation to produce the desired dyestuff. In this instance, the bridging link X is triatomic, namely —SO$_2$NHNH—.

As still another illustration, the above mentioned 5-amino - 2-methyl-m-xylylene-$\alpha^1,\alpha^3$-bis(sulfonylethanol) may be reacted with a brominated phthalocyanine, with elimination of HBr. In this instance, the bridging link X is monoatomic, namely —NH—. The product is then bis-sulfonated and nuclearly sulfonated as described above.

As still a further feature of this invention, it has been found that the embodiment of the above described process wherein a sulfatoethylsulfonylmethyl-containing intermediate is reacted with the chlorosulfonated phthalocyanine offers further unexpected advantages as compared with use of the hydroxyethylsulfonylmethyl-containing intermediate in the reaction followed by sulfation. The latter process generally requires a water-miscible organic solvent for the intermediate, pyridine being preferred because of its acid binding nature. On the other hand, the former process does not require an organic solvent in the sulfamidation reaction, the amount of sulfuric acid needed for conversion to the sulfate ester is relatively small (e.g. one fourth the amount used in the latter process), the dyestuff resulting from the sulfamidation reaction is an improved filterable form, and the final dyestuff apparently has a greater reactivity with cellulosic fibers as evidenced by less wash-off of color during soaping of the dyed fibers. The former process may be carried out, in accordance with the preferred embodiment by preliminary sulfation of the 5-amino-2-methyl-m-xylylene-$\alpha^1,\alpha^3$-bis(sulfonylethanol) to the corresponding bis-sulfate ester followed by reaction of this bis-sulfate ester with the chlorosulfonated phthalocyanine compound in aqueous media at a pH of about 4 to 7.

In either of the above-described sulfamidation processes, it will of course be obvious to the skilled worker that an inert acid binding agent of known type is desirably present to neutralize the HCl formed in the reaction, and to avoid formation of the unreactive HCl salt of the amine intermediate.

The dyestuffs of this invention when padded on cotton or rayon piece goods in the presence of urea and sodium bicarbonate and heat cured at about 300° F. for about 1 minute, yield dyeings having excellent wash-fastness and good light and crock-fastness in addition to other improved properties such as brightness and the like. These dyestuffs may also be employed for printing cotton piece goods and the like in the presence of urea, sodium carbonate, and sodium alginate gum, followed by heat curing or steam ageing to produce similarly improved results. Although not definitely established, it is believed that the improved results attainable by the use of the present dyestuffs may be attributed to a reactivity between the sulfatoethylsulfonylmethyl groups in the dyestuffs and reactive groups in the textile fiber (such as hydroxyl in cellulose), and to cross linking of the fiber molecule (e.g. cellulose) through the meta positioned sulfatoethylsulfonylmethyl groups in the case of the preferred dyestuffs.

The following examples are only illustrative of the present invention and are not to be regarded as limitative. All parts and proportions referred to herein are by weight unless otherwise indicated.

EXAMPLE 1

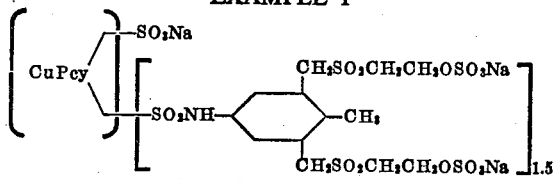

A. Chlorosulfonation 10 parts of phosphorus pentachloride are gradually added and dissolved in 177 parts chlorosulfonic acid at room temperature with stirring. After complete solution is obtained, 29.8 parts copper phthalocyanine are added portion-wise to the chlorosulfonic acid mixture during a one-half hour period. The temperature rises to 74° C. during the addition. The reaction mixture is then heated to 120° C. and held at 120° C. for three hours. The chlorosulfonation reaction mixture is cooled to 45° C. and drowned into 900 parts of ice. The precipitated chlorosulfonated copper phthalocyanine is filtered and the 174 parts of wet press cake are obtained by this process.

B. Sulfamidation 17.6 parts 5-amino-2-methyl-m-xylylene-$\alpha^1,\alpha^3$-bis(2-sulfonylethanol) are dissolved by warming (40–50° C.) in a solution of 76 parts of pyridine and 150 parts water. The mixture is cooled to room temperature and 87 parts of the above wet copper phthalocyanine sulfochloride cake are added gradually and stirred at room temperature overnight. The mixture is acidified by gradually adding 119 parts concentrated hydrochloric acid (specific gravity 1.188) and simultaneously diluted by the addition of 500 parts of ice and water. The precipitated sulfonamide is filtered and the cake washed with 100 parts 20% sodium chloride solution. After drying in a vacuum oven at 85° C., 37.6 parts of the sulfonamide derivative of copper phthalocyanine are obtained.

C. Sulfation 18.8 parts of the above sulfonamide derivative are gradually added and dissolved with stirring at room temperature in 131.6 parts 96% sulfuric. The mixture is stirred for 8 hours at room temperature and then drowned into 300 parts of ice and water. The bis-sulfate ester is precipitated at 60° C. by the addition of 60 parts of common salt and filtered. The cake is slurried with 200 parts water and the residual acid is neutralized by the addition of sodium bicarbonate. The bis-sulfate ester derivative is precipitated by the addition of 60 parts of common salt, filtered and dried in a vacuum oven at 85° C. 28.9 parts of dyestuff of the above formula, containing an average of 1 sulfonic group and 1.5 bis-sulfatoethylsulfonylmethyl-substituted pendant aryl nuclei per molecule, are obtained which when padded on cotton piece goods in the presence of urea and sodium bicarbonate and heat cured at 300° F. for three minutes, gives a bright turquoise blue shade having excellent wash fastness properties and also good light and crocking fastness. The dye also produces bright turquoise blue prints with excellent fastness properties when printed on cotton piece goods in the presence of urea, sodium carbonate and sodium alginate gum.

EXAMPLE 2

Sulfation of Intermediate 17.6 g. (0.05 mole) 5-amino-2-methyl-m-xylylene-$\alpha^1,\alpha^3$-bis(2-sulfonylethanol) are dissolved in 70.4 g. 96% sulfuric acid by stirring over night at room temperature (14–16 hours). The bis-sulfate ester solution is drowned onto 200 g. ice. The solution is cooled to 0–5° C. in an ice-salt bath and the bulk of the sulfuric acid is neutralized by a drop-wise addition of 74.5 ml. 50% caustic soda solution until a pH of 4.7 is reached. The bis-sulfate ester intermediate precipitates out.

Sulfamidation

A 71.7 g. portion of the presscake from Example 1A is gradually added to the above bis-sulfate ester slurry, simultaneously with 3 g. anhydrous sodium acetate. The mixture is stirred 1 hour 15 minutes and the pH raised to 7.0 by a dropwise addition of 2.2 ml. 50% caustic soda solution. After stirring over night the pH drops to 4.5. 1.6 ml of 50% caustic soda solution are added to bring the pH to 7.0. After 2 hours' stirring the pH drops to 6.0 and 0.4 ml. 50% caustic is added to maintain the pH at 7.0 for 5 hours. A total of 4.2 ml. of 50% caustic soda solution is used. The product is readily filtered, dried in a vacuum oven at 85° C.

Weight product: 53.7 g.

This product has the same formula as that of Example 1 but contains 1.9 pendant aryl groups and has an apparently greater reactivity with cellulosic fibers, as evidenced by less wash-off upon boiling of the dyed fibers in the presence of a soap solution.

EXAMPLE 3

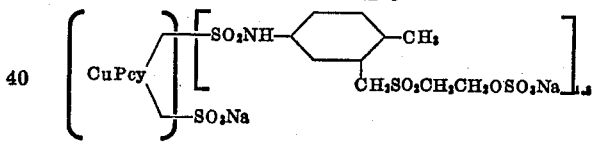

The process of Example 1 is repeated except that an equivalent amount of 4-amino-$\alpha^2$-o-xylyl-2-sulfonylethanol is employed instead of the 5-amino-2-methyl-m-xylylene - $\alpha^1,\alpha^3$ - bis(2-sulfonylethanol). A dyestuff of the above formula is obtained which is somewhat less reactive to textile fibers than the dyestuff of Example 1.

EXAMPLE 4

A dyestuff having the formula disclosed in Example 3 but containing 1.9 pendant aryl nuclei is prepared by the process of Example 2 except for use of the bis-sulfate ester of the intermediate employed in Example 3. This dyestuff is similarly of lower reactivity to textile fibers relative to the dyestuff of Example 2.

EXAMPLE 5

The process of Example 1 is repeated except that an equivalent amount of 3-p-anisidylmethyl-2-sulfonylethanol is employed instead of the 5-amino-2-methyl-m-xylylene - $\alpha^1,\alpha^3$ - bis(2-sulfonylethanol). A dyestuff of the above formula is obtained which has somewhat less reactivity to textile fibers than the dyestuff of Example 1.

EXAMPLE 6

A dyestuff of the formula shown in Example 5 but containing 1.9 pendant aryl nuclei is prepared following the procedure of Example 2 except that the bis-sulfate ester of the intermediate employed in Example 5 is used. The dyestuff has somewhat less reactivity to textile fibers than the dyestuff of Example 2.

EXAMPLE 7

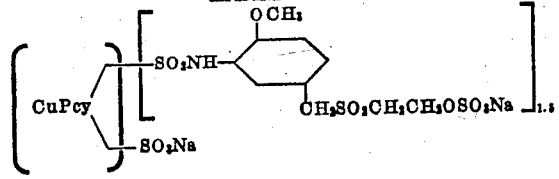

The procedure of Example 1 is repeated except that an equivalent amount of 5-o-anisidylmethyl-2-sulfonylethanol is employed instead of the 5-amino-2-methyl-m-xylylene-$\alpha^1,\alpha^3$-bis(2-sulfonylethanol). A dyestuff of the above formula is obtained which has somewhat less reactivity to textile fibers than the dyestuff of Example 1.

EXAMPLE 8

A dyestuff of the formula shown in Example 7, but containing about 1.9 pendant aryl nuclei is prepared following the procedure of Example 2 except that the bis-sulfate ester of the intermediate employed in Example 7 is used. The dystuff has somewhat less reactivity to textile fibers than the dyestuff of Example 2.

This invention has been disclosed with respect to certain preferred embodiments and various modifications and variations thereof will become obvious to persons skilled in the art. It is to be understood that such variations and modifications are to be included within the spirit and scope of this invention.

We claim:
1. A phthalocyanine dyestuff of the formula

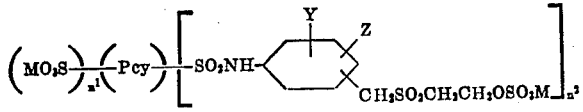

wherein Pcy represents phthalocyanine; Y and Z are selected from the group consisting of H, lower alkyl, lower alkoxy and —CH$_2$SO$_2$CH$_2$CH$_2$OSO$_3$M; M is a member of the group consisting of H and alkali metal, alkaline earth metal, ammonium and amine cations; $n^1$ has a value of 0–3; $n^2$ has a value of 1–4; and the sum of $n^1$ and $n^2$ is no more than 4.

2. A phthalocyanine dyestuff of the formula

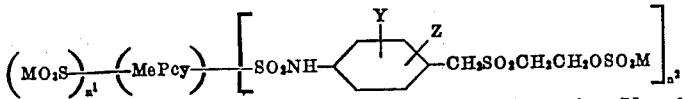

whereby MePcy represents metal phthalocyanine; Y and Z are selected from the group consisting of H, lower alkyl, lower alkoxy and —CH$_2$SO$_2$CH$_2$CH$_2$OSO$_3$M; M is a member of the group consisting of H and alkali metal, alkaline earth metal, ammonium and amine cations; $n^1$ has a value of 0–3; $n^2$ has a value of 1–4; and the sum of $n^1$ and $n^2$ is no more than 4.

3. A phthalocyanine dyestuff of the formula

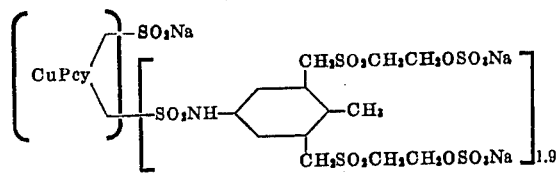

wherein Pcy represents copper phthalocyanine.

References Cited in the file of this patent
UNITED STATES PATENTS
2,300,572    Hoyer et al. _____ Nov. 3, 1942

OTHER REFERENCES

Migrdichian: Organic Synthesis, vol. 1, Reinhold, New York (1957), page 327.